United States Patent [19]
Nezat

[11] 3,870,083
[45] Mar. 11, 1975

[54] BACK PRESSURE REGULATOR FOR AUTOMOTIVE ENGINES

[76] Inventor: Jerry W. Nezat, Rt. 3, Box 1510, Estacada, Oreg. 97023

[22] Filed: Oct. 23, 1973

[21] Appl. No.: 408,510

[52] U.S. Cl. ............................ 138/45, 60/324, 181/72
[51] Int. Cl. ........................................... F16l 55/00
[58] Field of Search ............ 138/43, 40, 44, 46, 45; 181/33 HD, 36 B, 47 A, 72; 291/120; 222/490; 60/292, 324; 180/64 A

[56] References Cited
UNITED STATES PATENTS
1,622,526  3/1927  Lewis .......................... 222/490 UX
3,199,787  10/1965  Oishei et al. .................... 222/490 X Primary Examiner—Jerry W. Myracle
Attorney, Agent, or Firm—James D. Givnan, Jr.

[57] ABSTRACT

A device for attachment to an exhaust pipe of a vehicle to restrict the exhaust flow in a variable manner. The body of the device is of elastomeric material having flexible walls responsive to exhaust gas pressure to open and close under varying engine speeds. The device is adjustable along the exhaust conduit whereby the device is biased by the conduit end towards an open, less restrictive configuration for certain vehicle applications.

4 Claims, 11 Drawing Figures

BACK PRESSURE REGULATOR FOR AUTOMOTIVE ENGINES

BACKGROUND OF THE INVENTION

The present invention relates generally to a device for providing desired back pressure within an engine exhaust system and more particularly to such a device of a unitary flexible nature.

The products of combustion in an automotive engine which are classed as pollutants are carbon monoxide, unburned hydrocarbons and oxides of nitrogen, all of which must be reduced to certain levels in compliance with recently enacted State and Federal legislation. Considerable effort has and is being made in the modification of automobile engines and particularly exhaust systems to accomplish the reduction of the above mentioned pollutants.

SUMMARY OF THE INVENTION

The present invention is embodied within a device operable in conjunction with the above engine modifications and which device contributes towards a further decrease in exhaust emissions. The device is embodied within an attachment for an engine exhaust conduit to exert varying degrees of restriction on the passing exhaust flow. The device is of heat resistant, elastomeric material which in its normal unflexed state exerts a maximum degree of restriction on said gasses. The resilient nature of the device allows it to adjust automatically to an increased exhaust pressure while continuing to exert a restriction thereon. Repositioning of the device with respect to exhaust conduit results in the device having other restriction characteristics.

The present device is disclosed as being attachable in an adjustable manner to the end segment of an exhaust conduit. Said conduit may serve to bias the forwardly positioned device towards an open configuration whereby a lesser restriction is applied to the exhaust flow throughout all speeds of engine operation. As many variables exist in the "tuning" of an engine it is important that such a device be readily adaptable to suit a wide range of engine conditions. Additionally the use to which the vehicle is put, for example highway or city driving, is a factor to be taken into consideration when determining the optimum back pressure in an exhaust system. For example, in the case of light duty vehicles used primarily within a city at low speeds, a higher degree of exhaust restriction is desirable as compared with a vehicle driven at higher speeds on the highway. The present device readily accommodates such changes.

To further enhance the highly adaptable nature of the device the same may include the provision for remote adjustment with respect to the end of an exhaust conduit.

Important objects of the present invention include the provision of an exhaust conduit attachment providing for varying degrees of back pressure within an engine exhaust system throughout the range of engine speeds; an attachment readily adjustable with respect to the exhaust conduit to adapt the device to provide the exhaust system pressure applicable to the type of driving encountered by the vehicle; an exhaust conduit attachment readily positionable by remote means with respect to the vehicle exhaust conduit to permit adjustment of the device while underway.

DETAILED DESCRIPTION OF THE PREFERRED EMBODIMENTS

Figure 1:
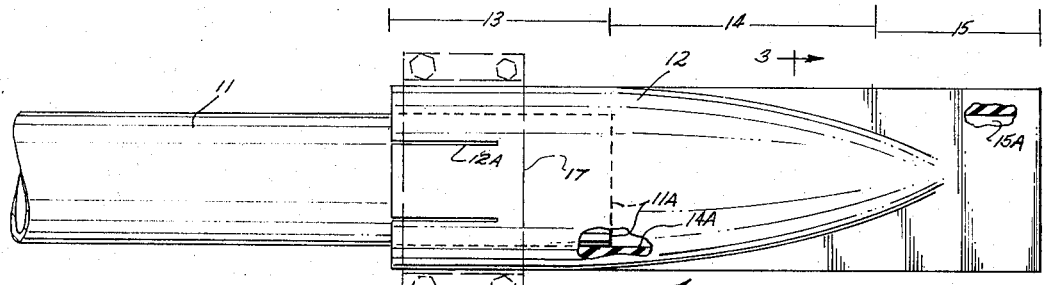
FIGS. 1 and 2 are side elevational and plan views respectively of one form of the present invention.
Figure 2:
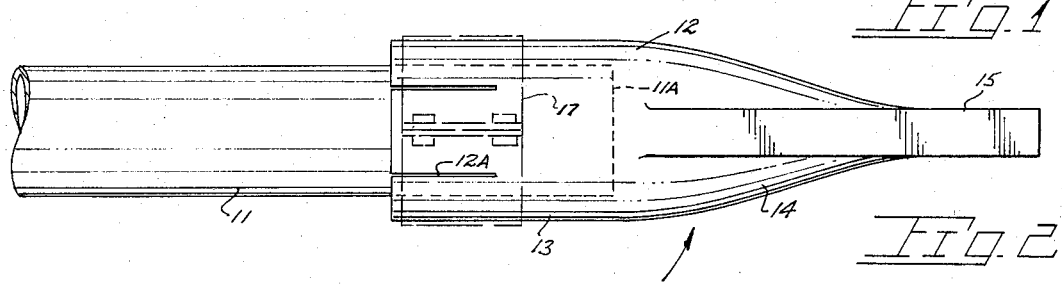

With continuing reference to the accompanying drawings wherein reference numerals indicate parts similarly identified in the following description, the reference numeral 10 indicates generally the present device affixed to an exhaust conduit 11 which may be the tailpipe of a vehicle powered by an internal combustion engine.

The device 10 comprises a body 12 of elastomeric material, preferably of molded construction, having a forward segment 13 of cylindrical shape for placement about the end segment of exhaust conduit 11 having an end 11A. The internal configuration of forward segment 13 of the device is determined by the size and shape of the end of conduit 11 and obviously may vary in crossection and length without departing from the present invention. Further, if desired, forward segment 13 may be provided with longitudinally directed slots 12A to facilitate attachment to conduit 11 and subsequent reattachment therealong.

A central segment 14 of the device 10 constitutes an internal transition area wherein the internal wall 14A is of elliptical shape. A rearward segment 15 of generally rectangular shape in section defines an exhaust orifice 16. Central segment 14 retains a uniform wall thickness with the internal configuration of wall 14A being initially of cylindrical shape and thence elliptical and gradually merging (as viewed in FIG. 3) with a pair of opposed inner wall surfaces 15A of rearward segment 15. Accordingly, the inner wall surfaces 14A of central segment 14 are of a crossectional as to admit the passage of exhaust conduit end 11A but with consequent outward displacement of internal wall surfaces 14A–15A of the device as later elaborated upon.

Figures 3, 4, 5:
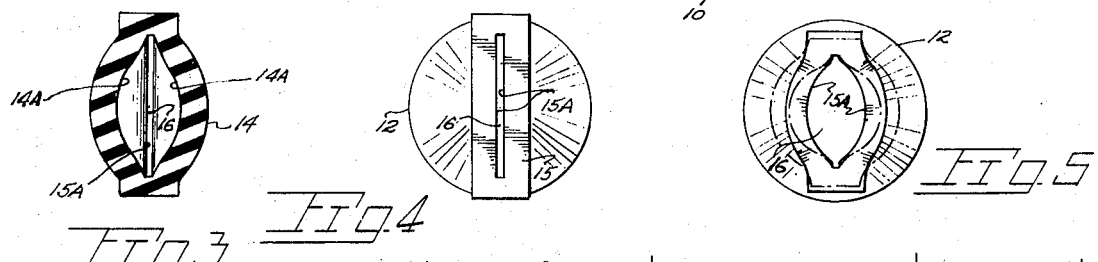
FIG. 3 is a sectional elevational view taken along line 3—3 of FIG. 1.
FIG. 4 is an end elevational view of FIG. 1, showing the device in a normal open configuration.
FIG. 5 is a view similar to FIG. 4 disclosing typical operational configurations.
Figure 6:
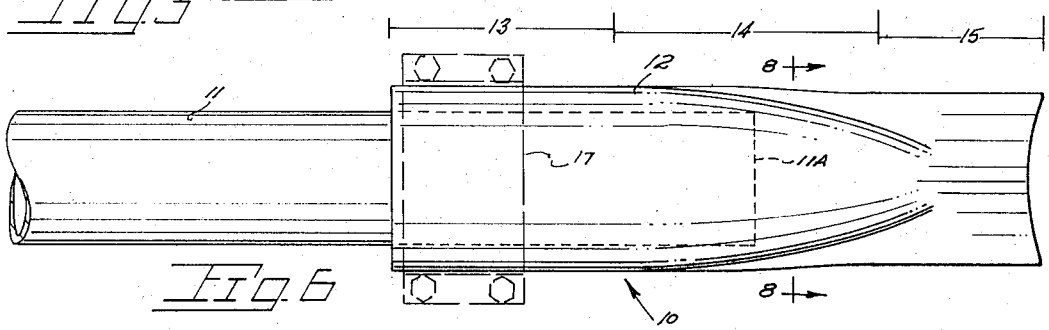
FIGS. 6 and 7 are side elevational and plan views respectively of the present device adjusted forwardly with respect to an exhaust conduit.
Figure 7:
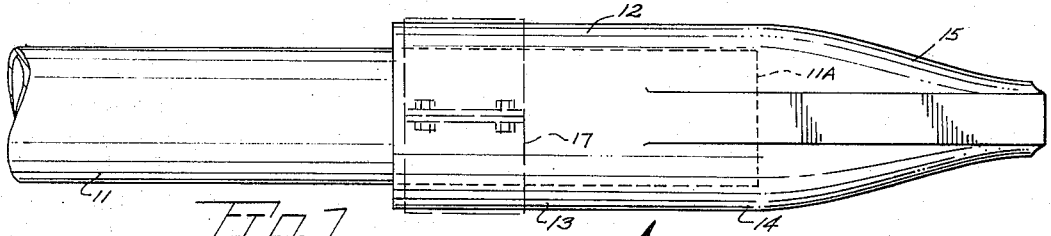
Figures 8, 9, 10:
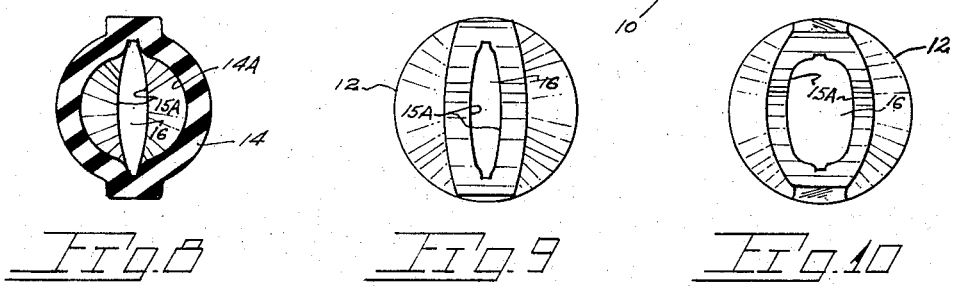
FIG. 8 is a sectional elevational view taken along line 8—8 of FIG. 6.
FIG. 9 is an end elevational view of FIG. 6 showing the device in a normal open configuration.
FIG. 10 is a view similar to FIG. 9 disclosing typical operational configurations.

As viewed in FIG. 4, the rearward segment 15 of the device terminates in elongate orifice 16 normally (absence of exhaust pressure) of slot like appearance unaltered by the supporting length of exhaust conduit 11. FIG. 5 shows, in full lines, the discharge orifice 16A outwardly flexed in response to exhaust gas pressure of an operating engine. As the flow is restricted by the slot like orifice 16, resulting pressure within the present device will exert a biasing effect on the walls 14A–15A to spread same as viewed in broken lines the extent determined by engine speed. A clamp 17 may include semicircular members in bolted attachment or other suitable clamping means.

In FIGS. 6 through 10, present device 10 is disclosed relocated forwardly with respect to the end 11A of exhaust conduit 11. As device 10 is advanced forwardly along the exhaust conduit the conduit end 11A enters the central segment 14 of the device which as aforesaid is normally of elliptical shape. Accordingly internal walls 14A and to a lesser extent internal walls 15A are biased towards an open configuration resulting in the orifice 16 having a normal size, in the absence of an exhaust flow, as viewed in FIG. 9. The presence of exhaust pressure will cause orifice 16 to enlarge to the shape viewed in FIG. 10 while increased exhaust pressure will still further expand the wall surfaces to the position shown in broken lines.

The exhaust conduit end 11A, as shown in FIGS. 6 through 10, serves to mechanically bias the internal walls 14A–15A of the device apart. The restrictive nature of the device on the exhaust flow is accordingly less when so readjusted to a forward position.

Figure 11:
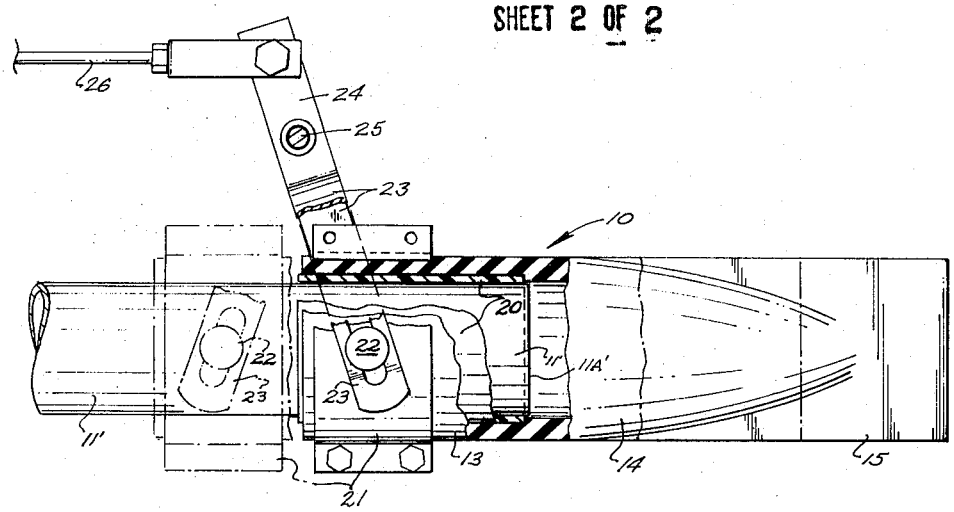
FIG. 11 is a side elevational view of the device in combination with means for remotely positioning same on an exhaust conduit.

In FIG. 11 I diclose means for positioning the device at 10' along the exhaust conduit 11' from a remote location such as the drivers station to permit repositioning the device while underway. Accordingly for vehicles operated for about equal periods of low and high engine speeds the device may be conveniently adjusted to best achieve the desired back pressure within the exhaust system.

Fixed in place within the forward end of device 10 is a liner or sleeve 20 which is of heat resistant material such as a synthetic resin polymer such as that sold under the trademark Teflon. The sleeve is circumposed in a sliding fit about the end segment of the exhaust conduit 11' in a manner restricting blowby therebetween. Disposed about the forward end segment of device 10 is a clamp 21 similar to earlier mentioned clamp 17 but with flanged studs as at 22 extending diametrically outwardly to slidably receive yoke members 23 of a yoke type coupling 24. A yoke support bar 25 is suitably mounted to the vehicle frame (not shown) with fore and aft movement imparted to the yoke 24 by a control rod 26 which is suitably linked to a driver actuated control. The extreme positions of the device 10' would be as earlier described.

While I have shown but two embodiments of the invention it will be apparent to those skilled in the art that the invention may be embodied still otherwise without departing from the spirit and scope of the invention.

Having thus described the invention what is desired to be secured under a Letters Patent is:

1. A device for attachment to the discharge end of an exhaust conduit of an internal combustion engine to restrict a passing exhaust flow, said device comprising, a molded body of heat resistant elastomeric material having a forward segment of cylindrical shape for the reception of the exhaust conduit, said forward segment longitudinally slotted for a portion of its length, said body having a central segment with elliptical internal wall surfaces and walls of uniform thickness converging in the direction of exhaust flow resulting in the central segment being of lesser internal sectional area than the sectional area of the exhaust conduit, said body having a rearward segment with opposed walls having substantially parallel internal wall surfaces, in the absence of exhaust flow, terminating in an elongate orifice at the rearward end of said body, said orifice being of substantially less section area than the exhaust conduit to thereby constitute a restriction to the exhaust flow, said body and particularly the walls of said rearward section being responsive to various exhaust pressures to exert a desired restrictive effect on the exhaust flow, said body adapted for repositioning forwardly along the exhaust conduit whereby the conduit end will mechanically bias the internal walls of the central segment away from one another to reduce the restrictive effect of the device on an exhaust flow, and clamping means circumposed about the molded body and retaining same at a selected position relative to the end of the exhaust conduit.

2. The device as claimed in claim 1 wherein the internal walls of said rearward segment may be biased mechanically towards an open configuration upon advancement of the device along the exhaust conduit, the last mentioned walls flexing further outwardly in the presence of exhaust pressure.

3. The device as claimed in claim 1 additionally including means for repositioning said body along the exhaust conduit relative to the end of same, said positioning means including a driver operated control, means coupling said control to the body of the device.

4. The device as claimed in claim 3 additionally including a liner internally disposed within the molded body to facilitate movement of the device along the exhaust conduit.

* * * * *